(12) United States Patent
Kishiyama et al.

(10) Patent No.: US 8,428,043 B2
(45) Date of Patent: Apr. 23, 2013

(54) BASE STATION, MOBILE STATION, SIGNAL TRANSMISSION METHOD, AND SIGNAL RECEPTION METHOD

(75) Inventors: Yoshihisa Kishiyama, Yokosuka (JP); Motohiro Tanno, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 110 days.

(21) Appl. No.: 13/058,220

(22) PCT Filed: Aug. 11, 2009

(86) PCT No.: PCT/JP2009/064154
§ 371 (c)(1),
(2), (4) Date: Apr. 27, 2011

(87) PCT Pub. No.: WO2010/018817
PCT Pub. Date: Feb. 18, 2010

(65) Prior Publication Data
US 2011/0206026 A1      Aug. 25, 2011

(30) Foreign Application Priority Data
Aug. 11, 2008     (JP) .................................. 2008-207487

(51) Int. Cl.
*H04J 3/04* (2006.01)
(52) U.S. Cl.
USPC ........................................ 370/349; 370/535
(58) Field of Classification Search .................. 370/349, 370/319, 337, 344, 532, 533, 534, 535
See application file for complete search history.

(56) References Cited

U.S. PATENT DOCUMENTS 8,031,688 B2 * 10/2011 Papasakellariou et al. ... 370/344
8,155,100 B2 * 4/2012 Papasakellariou et al. ... 370/344

FOREIGN PATENT DOCUMENTS

| JP | 2004-129249 A | 4/2004 |
|---|---|---|
| JP | 2008-085379 A | 4/2008 |

OTHER PUBLICATIONS

NTT DoCoMo, Inc., "Proposed Techniques for LTE-Advanced," 3GPP TSG RAN WG1 Meeting #53bis, R1-082575, Jul. 4, 2008, 36 pages.
Patent Abstracts of Japan, Publication No. 2008-085379, dated Apr. 10, 2008, 1 page.
Patent Abstracts of Japan, Publication No. 2004-129249, dated Apr. 22, 2004, 1 page.
3GPP TS 36.306 V8.1.0, Mar. 2008, "Evolved Universal Terrestrial Radio Access (E-Utra) User Equipment (UE) radio access capabilities," 13 pages.
International Search Report issued in PCT/JP2009/064154, mailed on Nov. 10, 2009, with translation, 8 pages.
Written Opinion issued in PCT/JP2009/064154, mailed on Nov. 10, 2009, 3 pages.
Japanese Office Action for Application No. 2008-207487, mailed on Dec. 11, 2012 (4 pages).
Huawei, "Physical layer technologies for LTE-Advanced", 3GPP TSG RAN WG1 #53 R1-081838; Kansas City, MO., USA, May 5-9, 2008 (8 pages).

* cited by examiner

*Primary Examiner* — Brenda H Pham
(74) *Attorney, Agent, or Firm* — Osha Liang LLP

(57) ABSTRACT

A base station for communicating within a system band including plural basic frequency blocks includes a signal generating unit configured to generate data and control signals; an intermediate signal generating unit configured to generate intermediate signals; a multiplexing unit configured to add one or more subcarriers such that center frequencies of signal bands for the respective basic frequency blocks are placed at predetermined frequency intervals, and multiplex the intermediate signals and data and control signals; and a transmitting unit configured to transmit the multiplexed signals.

6 Claims, 12 Drawing Sheets

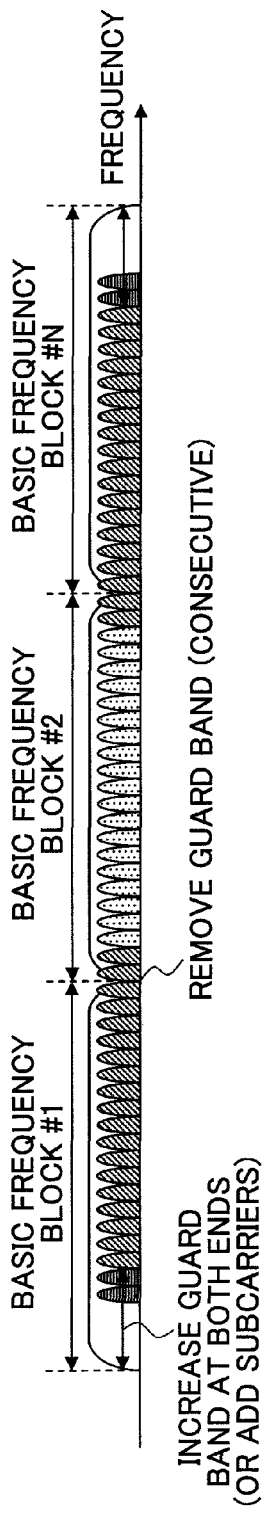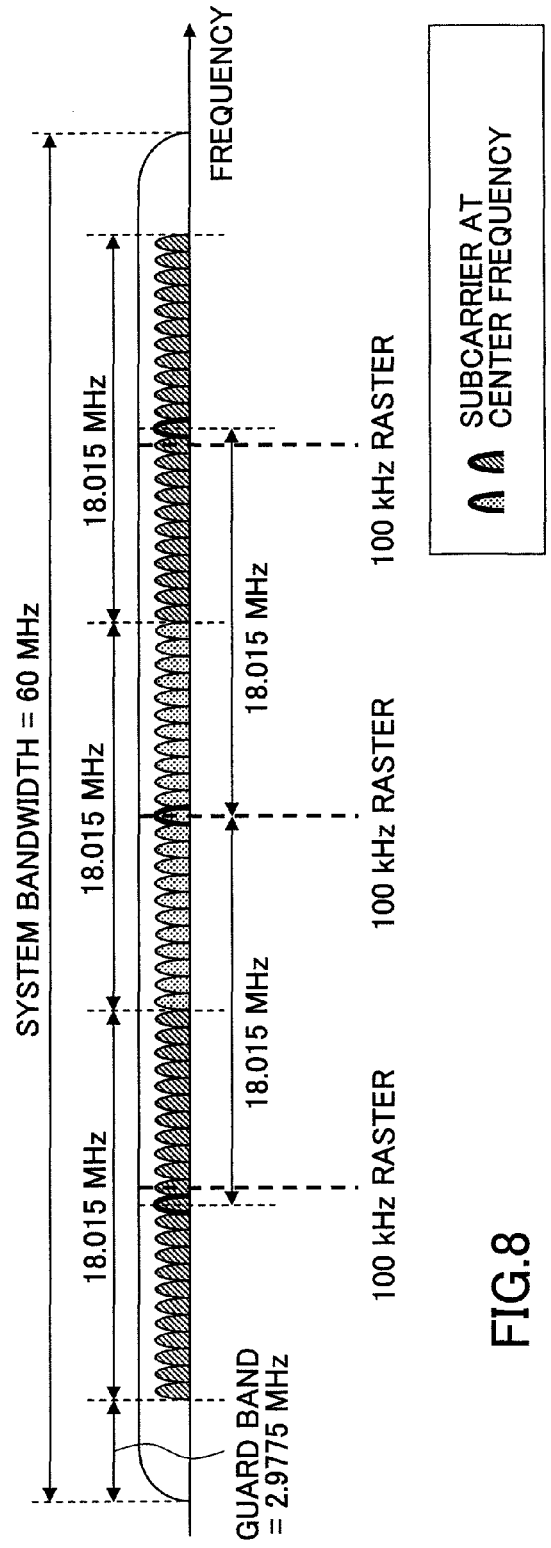
FIG.8

BASE STATION, MOBILE STATION, SIGNAL TRANSMISSION METHOD, AND SIGNAL RECEPTION METHOD

TECHNICAL FIELD

The present invention relates to a base station, a mobile station, a signal transmission method, and a signal reception method.

BACKGROUND ART

In 3GPP (3rd Generation Partnership Project), radio interfaces for E-UTRA (Evolved UMTS Terrestrial Radio Access) are standardized. The system bandwidth defined for E-UTRA is 1.4 MHz at the minimum and 20 MHz at the maximum, the maximum downlink data rate is 300 Mbps, and the maximum uplink data rate is 75 Mbps (see 3GPP TS36.306 (V8.1.0)).

Depending on the maximum system bandwidth of 20 MHz for E-UTRA, the maximum transmission and reception bandwidth of a mobile station (also referred to as an E-UTRA terminal or an LTE terminal) for E-UTRA is 20 MHz. For example, the mobile station can transmit and receive with the bandwidth of 5 MHz when the system bandwidth is 5 MHz, and the mobile station can transmit and receive with the bandwidth of 20 MHz when the system bandwidth is 20 MHz.

DISCLOSURE OF INVENTION

Problem(s) to be Solved by the Invention

In a future radio access system such as IMT-Advanced (also referred to as LTE-Advanced in 3GPP), a higher data rate (for example, the maximum downlink data rate of 1 Gbps) is required.

Depending on such a higher data rate, a wider system bandwidth (for example, the maximum system bandwidth of 100 MHz) is required.

On the other hand, in order to achieve orderly (smooth) transition from the existing system such as E-UTRA to the future radio access system, full support of the existing terminals such as E-UTRA terminals is required.

In order to satisfy these requirements, the future radio access system needs to support UE (User Equipment) capabilities of plural maximum transmission and reception bandwidths. For example, the future radio access system needs to support both the mobile station which can transmit and receive with the bandwidth of 100 MHz (or a portion thereof) and the mobile station which can transmit and receive with the bandwidth of 20 MHz.

In the presence of mobile stations with UE capabilities of plural maximum transmission and reception bandwidths, it is desirable that the center frequency for the mobile stations to receive signals be placed at one of predetermined frequency intervals. For example, since E-UTRA terminals perform cell search at 100 kHz intervals, the center frequency of the frequency band which the E-UTRA terminals can detect during cell search needs to be placed at 100 kHz channel raster. For example, even if the system bandwidth is 100 MHz, the center frequency of the frequency band which the E-UTRA terminals can detect during cell search needs to be placed at 100 kHz channel raster.

Means for Solving the Problem(s)

In one aspect of the present invention, there is provided a base station for communicating within a system band including plural basic frequency blocks, including:

a signal generating unit configured to generate data and control signals;

an intermediate signal generating unit configured to generate intermediate signals;

a multiplexing unit configured to add one or more subcarriers such that center frequencies of signal bands for the respective basic frequency blocks are placed at predetermined frequency intervals, and multiplex the intermediate signals and data and control signals; and a transmitting unit configured to transmit the multiplexed signals.

In another aspect of the present invention, there is provided a mobile station for communicating within a transmission and reception band including plural basic frequency blocks, including:

a receiving unit configured to receive signals;

a separating unit configured to separate from the received signals intermediate signals on one or more subcarriers which are added such that center frequencies of signal bands for the respective basic frequency blocks are placed at predetermined frequency intervals; and a decoding unit configured to decode data and control signals.

In another aspect of the present invention, there is provided a signal transmission method, including the steps of:

dividing a system band into plural basic frequency blocks;

generating data and control signals;

generating intermediate signals;

adding one or more subcarriers such that center frequencies of signal bands for the respective basic frequency blocks are placed at predetermined frequency intervals;

multiplexing the intermediate signals and data and control signals; and transmitting the multiplexed signals.

In another aspect of the present invention, there is provided a signal reception method, including the steps of:

receiving signals;

separating from the received signals intermediate signals on one or more subcarriers which are added such that center frequencies of signal bands for respective basic frequency blocks are placed at predetermined frequency intervals; and decoding data and control signals.

In another aspect of the present invention, there is provided a base station for communicating within a system band including plural basic frequency blocks, including:

a signal generating unit configured to generate data and control signals;

a subcarrier decreasing unit configured to decrease the number of subcarriers in signal bands for the basic frequency blocks such that center frequencies of the signal bands for the respective basic frequency blocks are placed at predetermined frequency intervals;

a multiplexing unit configured to multiplex the data and control signals into the respective basic frequency blocks in which the number of subcarriers is decreased; and a transmitting unit configured to transmit the multiplexed signals.

In another aspect of the present invention, there is provided a mobile station for communicating within a transmission and reception band including plural basic frequency blocks, including:

a receiving unit configured to receive signals;

a separating unit configured to separate data and control signals in the respective basic frequency blocks;

a null signal inserting unit configured to insert null signals into frequency bands in which the number of subcarriers is decreased such that center frequencies of signal bands for the respective basic frequency blocks are placed at predetermined frequency intervals; and a decoding unit configured to decode data and control signals.

In another aspect of the present invention, there is provided a signal transmission method, including the steps of:

dividing a system band into plural basic frequency blocks;
generating data and control signals;
decreasing the number of subcarriers in signal bands for the basic frequency blocks such that center frequencies of the signal bands for the respective basic frequency blocks are placed at predetermined frequency intervals;
multiplexing the data and control signals into the respective basic frequency blocks in which the number of subcarriers is decreased; and
transmitting the multiplexed signals.

In another aspect of the present invention, there is provided a signal reception method, including the steps of:

receiving signals;
separating data and control signals in respective basic frequency blocks;
inserting null signals into frequency bands in which the number of subcarriers is decreased such that center frequencies of signal bands for the respective basic frequency blocks are placed at predetermined frequency intervals; and
decoding data and control signals.

Advantageous Effect of the Invention

According to an embodiment of the present invention, the center frequency for mobile stations to receive signals can be placed at one of predetermined frequency intervals.

BRIEF DESCRIPTION OF THE DRAWINGS

FIG. 8 shows a third example of combining basic frequency blocks.

DETAILED DESCRIPTION OF THE PREFERRED EMBODIMENTS

In an embodiment of the present invention, a system band in a radio access system includes plural basic frequency blocks. For example, in a future radio access system such as an IMT-Advanced system, depending on the requirement of a higher data rate, a wider system bandwidth is required. The system bandwidth of the future radio access system may include plural basic frequency blocks. The basic frequency block may have the bandwidth of 20 MHz that is defined as the maximum transmission and reception bandwidth for E-UTRA terminals.

A base station controls the number of subcarriers such that center frequencies of the signal bands for the respective basic frequency blocks are placed at predetermined frequency intervals. For example, the base station may add one or more subcarriers such that the center frequencies of the signal bands for the respective subcarriers are placed at the predetermined frequency intervals. Alternatively, the base station may decrease the number of subcarriers for the respective subcarriers such that the center frequencies of the signal bands for the respective basic frequency blocks are placed at the predetermined frequency intervals.

When the center frequencies of the signal bands are placed at the predetermined frequency intervals, a mobile station can detect the base station by performing cell search at the predetermined frequency intervals.

With reference to the accompanying drawings, embodiments of the present invention are described below.

<Concept of a Layered Bandwidth Configuration or a Layered OFDMA Configuration>

Figure 1:
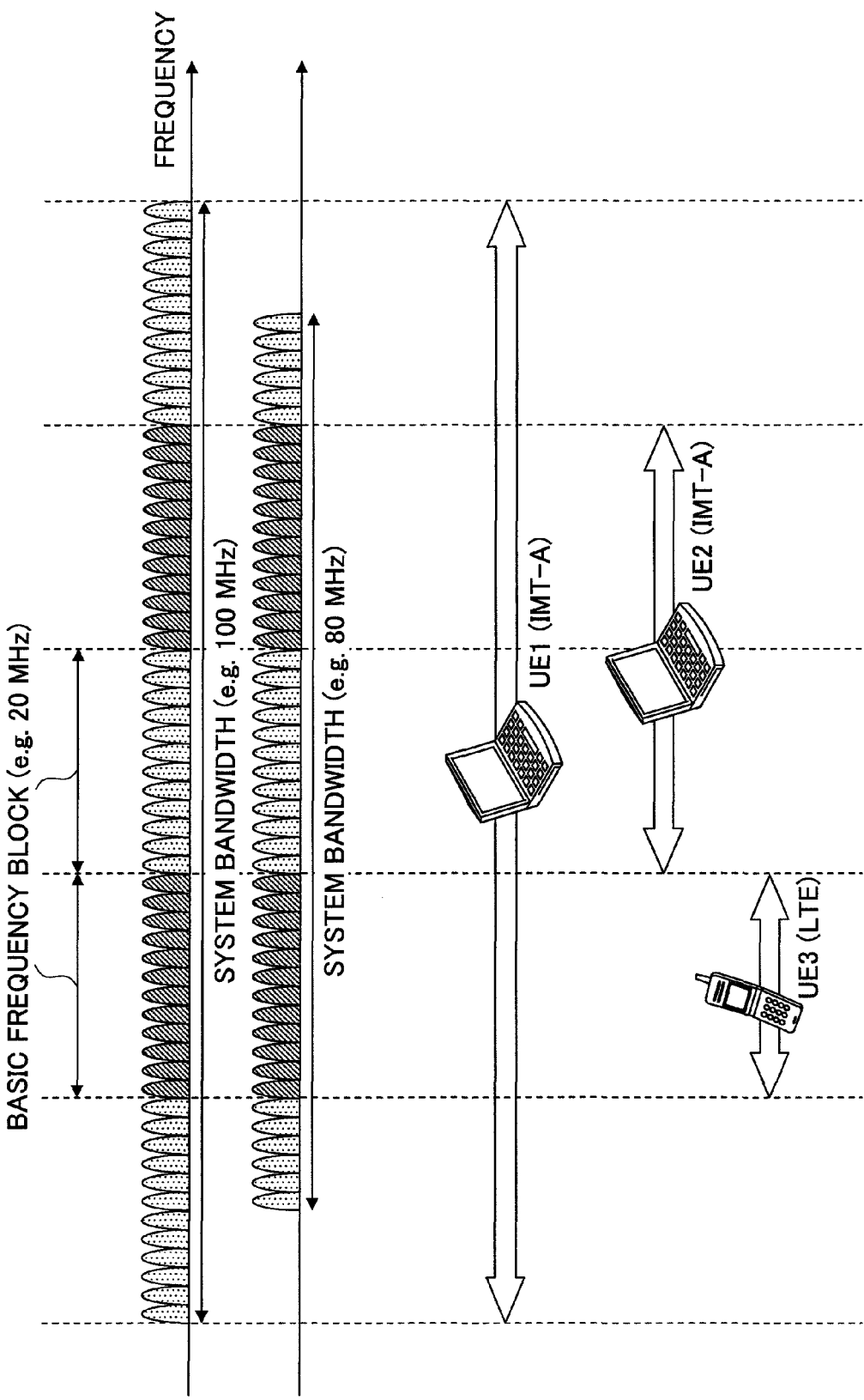
FIG. 1 shows a conceptual diagram of a bandwidth configuration in a radio access system.

With reference to FIG. 1, the concept of a bandwidth configuration (layered bandwidth configuration) in a radio access system in accordance with an embodiment of the present invention is described below. It is assumed that requirements for IMT-Advanced are to be satisfied in the radio access system in accordance with the embodiment of the present invention. Specifically, to provide a wider system bandwidth, it is assumed that the radio access system has the system band of 100 MHz, for example. In this case, the system band can be divided into five frequency blocks of 20 MHz. The frequency block of 20 MHz corresponding to the transmission and reception bandwidth for the E-UTRA terminal is referred to as a basic frequency block. For example, the basic frequency block may have a frequency bandwidth defined for a system which is backward compatible with the radio access system in accordance with the embodiment of the present invention. In FIG. 1, the center frequency of the center basic frequency block is the same as the center frequency of the system band, since the system band can be divided into an odd number of basic frequency blocks.

When the radio access system has the system band of 80 MHz, for example, the system band can be divided into four basic frequency blocks. However, as shown in FIG. 1, the system band may be divided into basic frequency blocks, such that the center frequency of the center basic frequency block is the same as the center frequency of the system band. In this case, the system band is formed by plural basic frequency blocks and the remaining subcarriers.

In this manner, by forming a wide system band using plural basic frequency blocks (and the remaining subcarriers) each of which can be supported in E-UTRA, it is possible to fully support E-UTRA terminals in the radio access system in accordance with the embodiment of the present invention. At the same time, it is possible to support new terminals (IMT-A terminals) which have a wider transmission and reception bandwidth than the E-UTRA system bandwidth (the bandwidth of the basic frequency block) in the radio access system in accordance with the embodiment of the present invention, since plural basic frequency blocks (multiple signal bandwidths) can be allocated to the new terminals (IMT-A terminals). In other words, the E-UTRA terminals can communicate using the basic frequency block, which is a portion of the system band. In addition, the IMT-A terminals can communicate using plural basic frequency blocks depending on their UE capabilities.

<Examples of Combining Basic Frequency Blocks>

Figure 2:
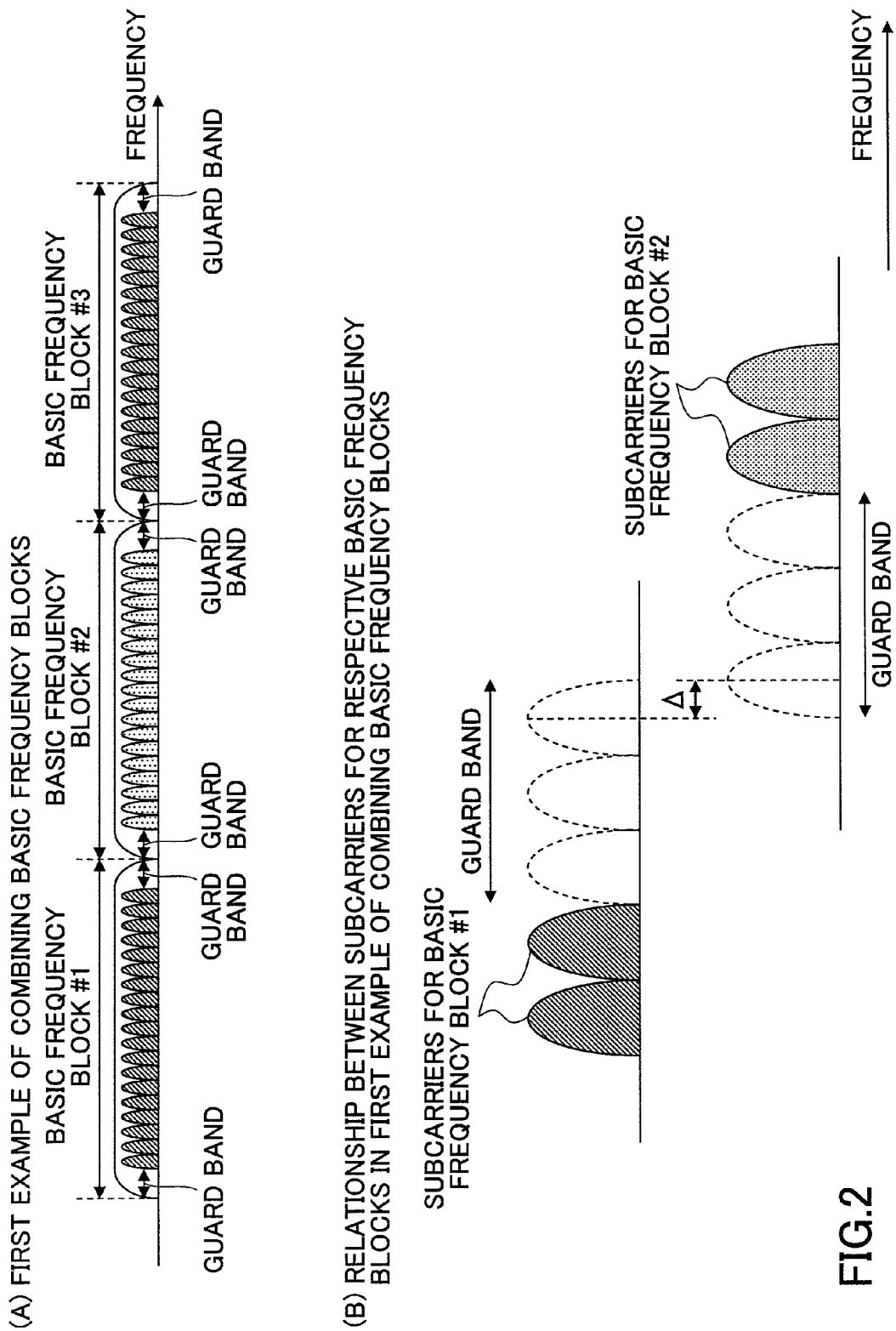
FIG. 2 shows a first example of combining basic frequency blocks.
Figure 3:
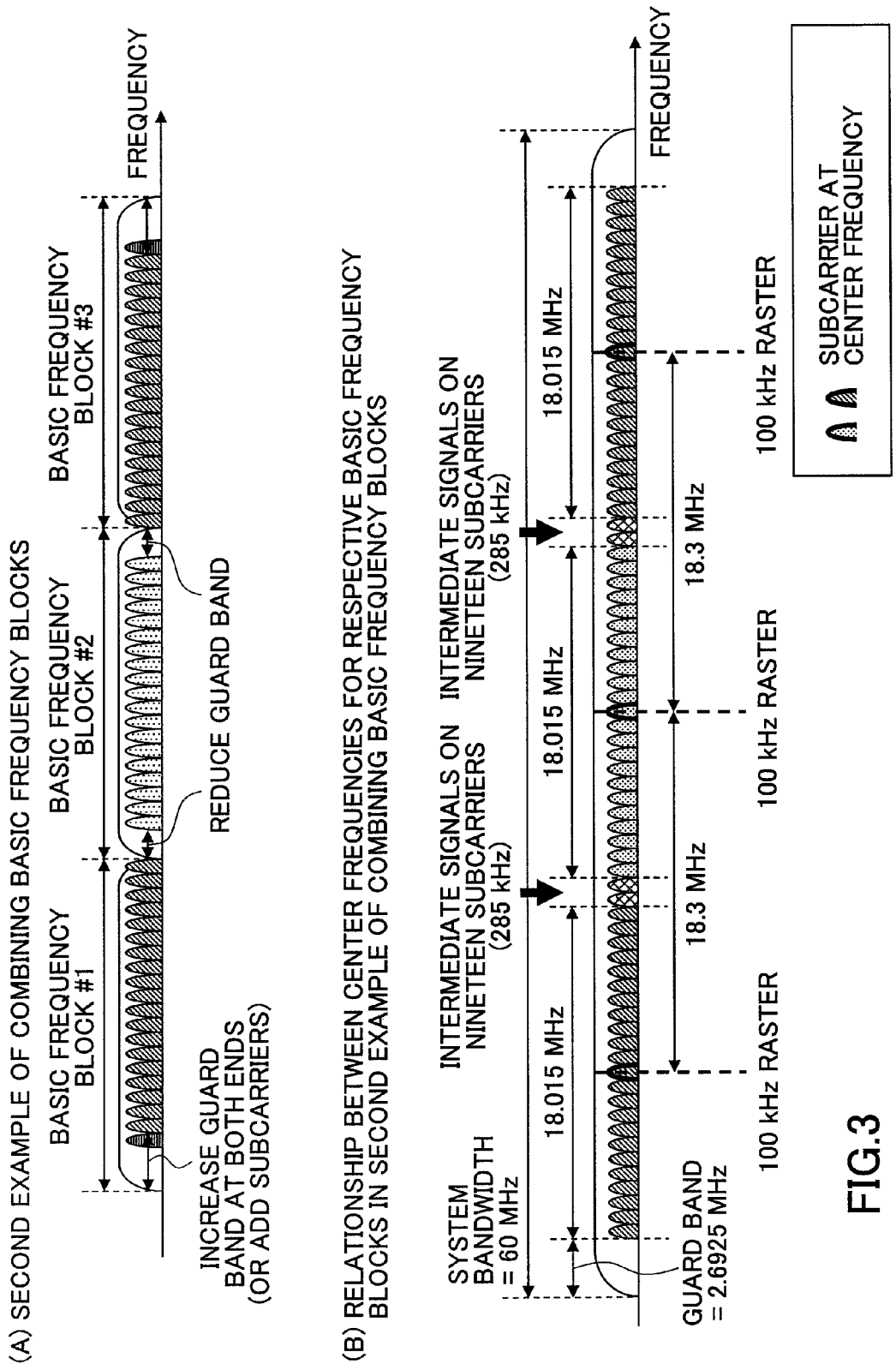
FIG. 3 shows a second example of combining basic frequency blocks.

With reference to FIGS. 2 and 3, examples of combining plural basic frequency blocks are described below. While, for ease of explanation, the system band is divided into three basic frequency blocks in FIGS. 2 and 3, the system band may be divided into any number of basic frequency blocks. As shown in FIG. 1, the system band may be formed by plural basic frequency blocks and the remaining subcarriers.

FIG. 2(A) shows a first example of combining basic frequency blocks in consideration of guard bands in the respective basic frequency blocks. In E-UTRA, a guard band of approximately 1 MHz is provided at the both ends of the system band of 20 MHz, in order to reduce interference among systems. Specifically, the basic frequency block has a signal band of 18.015 MHz, and the guard band of (20−18.015)/2 MHz is provided at the both ends of the signal band. In a radio access system in accordance with an embodiment of the present invention, basic frequency blocks including the guard band of approximately 1 MHz at the both ends may be combined.

In the first example shown in FIG. 2 (A), however, all subcarriers for the respective basic frequency blocks #1-#3 may not be placed at predetermined subcarrier intervals. With reference to FIG. 2(B), the relationship between the rightmost frequency in the basic frequency block #1 and the leftmost frequency in the basic frequency block #2 shown in FIG. 2(A) is described in detail below. Assuming that each basic frequency block has a signal band of 18.015 MHz, for example, a displacement Δ is developed between the subcarriers for the basic frequency block #1 which are extended toward the basic frequency block #2 with the subcarrier intervals of 15 kHz and the subcarriers for the basic frequency block #2. In other words, the displacement is developed between the frequency for inverse Fourier transformation in the basic frequency block #1 and the frequency for inverse Fourier transformation in the basic frequency block #2. The reason for the displacement is because the bandwidth 20 MHz for each basic frequency block is not an integral multiple of the subcarrier interval 15 kHz. Accordingly, the basic frequency blocks #1-#3 cannot be collectively processed by a single inverse Fourier transformation, and thus an inverse Fourier transform unit may be needed for each basic frequency block. As a result, the configuration of the base station to transmit plural basic frequency blocks may be complicated. To simplify the configuration, it is desirable that the basic frequency blocks #1-#3 can be collectively processed by a single inverse Fourier transformation.

FIG. 3(A) shows a second example of combining basic frequency blocks such that each guard band between adjacent basic frequency blocks is reduced. In the same radio access system, interference among basic frequency blocks can be reduced by allocation of orthogonal radio resources. In other words, the guard band between adjacent basic frequency blocks can be reduced. The frequency band between signal bands for the basic frequency blocks may be used for guard bands or used for transmission and reception of data or control signals.

By reducing guard bands as shown in FIG. 3(A), the center frequencies of the signal bands for the respective basic frequency blocks can be placed at predetermined frequency intervals. The predetermined frequency intervals are defined as candidates for the center frequency for a mobile station to receive signals, and may correspond to frequency intervals at which a mobile station scans the frequency during cell search. For example, since candidates (channel rasters) for the center frequency are defined at 100 kHz intervals in E-UTRA, the predetermined frequency intervals may be determined to be 100 kHZ intervals. As shown in FIG. 3(B), for example, nineteen subcarriers (285 kHz) which are used for transmission and reception of intermediate signals, data signals, or control signals may be added between the signal band for the basic frequency block #1 and the signal band for the basic frequency block #2. The nineteen subcarriers are consecutively placed without any spacing between subcarriers for the basic frequency block #1 and subcarriers for the basic frequency block #2. By consecutively placing subcarriers, the displacement Δ shown in FIG. 2(B) can be avoided. In addition, by adding the nineteen subcarriers, the center frequencies of the signal bands for the respective basic frequency blocks are placed at the intervals of 18.3 MHz, and thus the center frequencies can be placed at 100 kHz channel rasters. Accordingly, a mobile station can detect the basic frequency blocks #1-#3 by performing cell search at 100 kHz intervals.

It should be noted that, when the guard band between the adjacent basic frequency blocks is reduced, unused bands appear at the both ends of the system band. These unused bands may be used for guard bands or signal bands. Increasing the guard bands at the both ends of the system band can reduce interference with neighbor systems. On the other hand, increasing the signal bands can improve transmission efficiency.

<Configuration of a Base Station>

Figure 4:
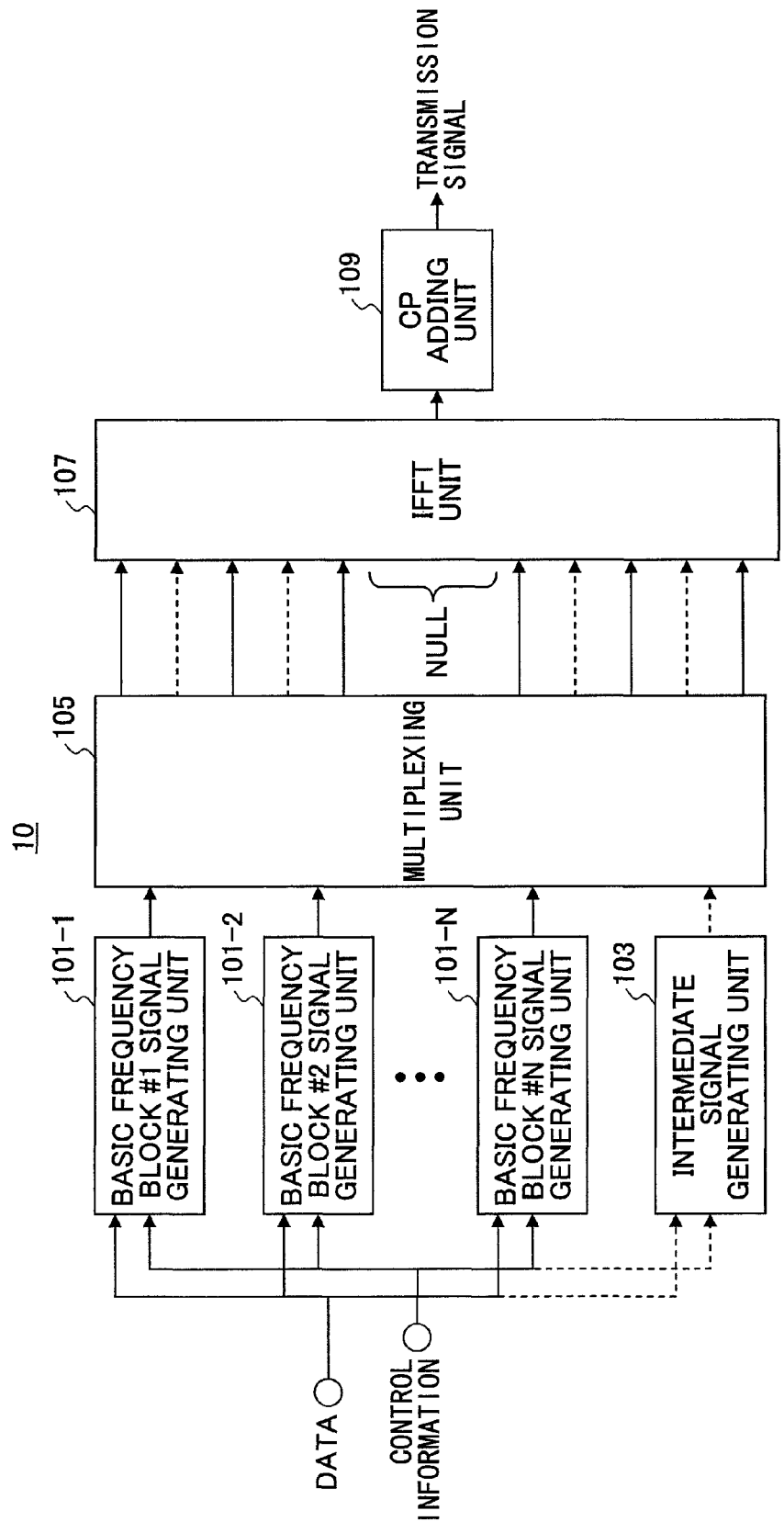
FIG. 4 shows a first exemplary block diagram of a base station.

FIG. 4 shows an exemplary block diagram of a base station 10 for implementing the second example of combining basic frequency blocks as shown in FIG. 3(B). The base station 10 includes basic frequency block signal generating units 101-1 through 101-N, an intermediate signal generating unit 103, a multiplexing unit 105, an IFFT (inverse fast Fourier transform) unit 107, and a CP (cyclic prefix) adding unit 109. The base station 10 includes the basic frequency block signal generating units 101-1 through 101-N corresponding to the number of basic frequency blocks included in the system band.

Each of the basic frequency block signal generating units 101-1 through 101-N generates data and control signals to be multiplexed into the signal band for the corresponding basic frequency block. It should be noted that data and control signals for IMT-A terminals may be multiplexed into the subcarriers added for intermediate signals as shown in FIG. 3(B).

The intermediate signal generating unit 103 generates intermediate signals to be multiplexed into the added subcarriers. The intermediate signals may be data signals or control signals for IMT-A terminals. Alternatively, the intermediate signals may be signals for suppressing PAPR (peak to average power ratio) of transmission signals.

The multiplexing unit 105 controls the number of subcarriers such that the center frequencies of the signal bands for the respective basic frequency blocks are placed at predetermined frequency intervals. For example, when it is required that the center frequencies of the signal bands for the respective basic frequency blocks be placed at 100 kHz channel rasters, the multiplexing unit 105 adds one or more subcarriers between the signal bands for the basic frequency blocks to control the positions of the center frequencies. For example, when the basic frequency block has a signal band of 18.015 MHz, the multiplexing unit 105 may add nineteen subcarriers (285 kHz) between the basic frequency blocks. By adding the nineteen subcarriers, the center frequencies of the signal bands for the respective basic frequency blocks are placed at the intervals of 18.3 MHz, and thus the center frequencies can be placed at 100 kHz channel rasters. It should be noted that the configuration of subcarriers in the system band including information about the added subcarriers may be determined in advance in the system or may be determined by the base station and provided to mobile stations on a broadcast channel.

The multiplexing unit 105 multiplexes the data and control signals generated by the basic frequency block signal generating units 101-1 through 101-N into signal bands for the respective basic frequency blocks. The multiplexing unit 105 may multiplex control signals such as reference signals. For example, the multiplexing unit 105 multiplexes the data and control signals into the signal bands of 18.015 MHz for the respective basic frequency blocks. In addition, the multiplexing unit 105 multiplexes the intermediate signals generated by the intermediate signal generating unit 103 into the subcarriers added between the signal bands for the respective basic frequency blocks. For example, the multiplexing unit 105 multiplexes the intermediate signals into the added nineteen subcarriers (285 kHz).

The IFFT unit 107 performs inverse Fourier transformation of the multiplexed signals to convert the signals into the time domain. The IFFT unit 107 preferably performs inverse Fourier transformation for the whole system band, rather than for each basic frequency block. It should be noted that the IFFT unit 107 performs inverse Fourier transformation in consideration of guard bands (shown as NULL) at both ends of the system band.

The CP adding unit 109 adds cyclic prefixes to transmission signals.

Figure 5:
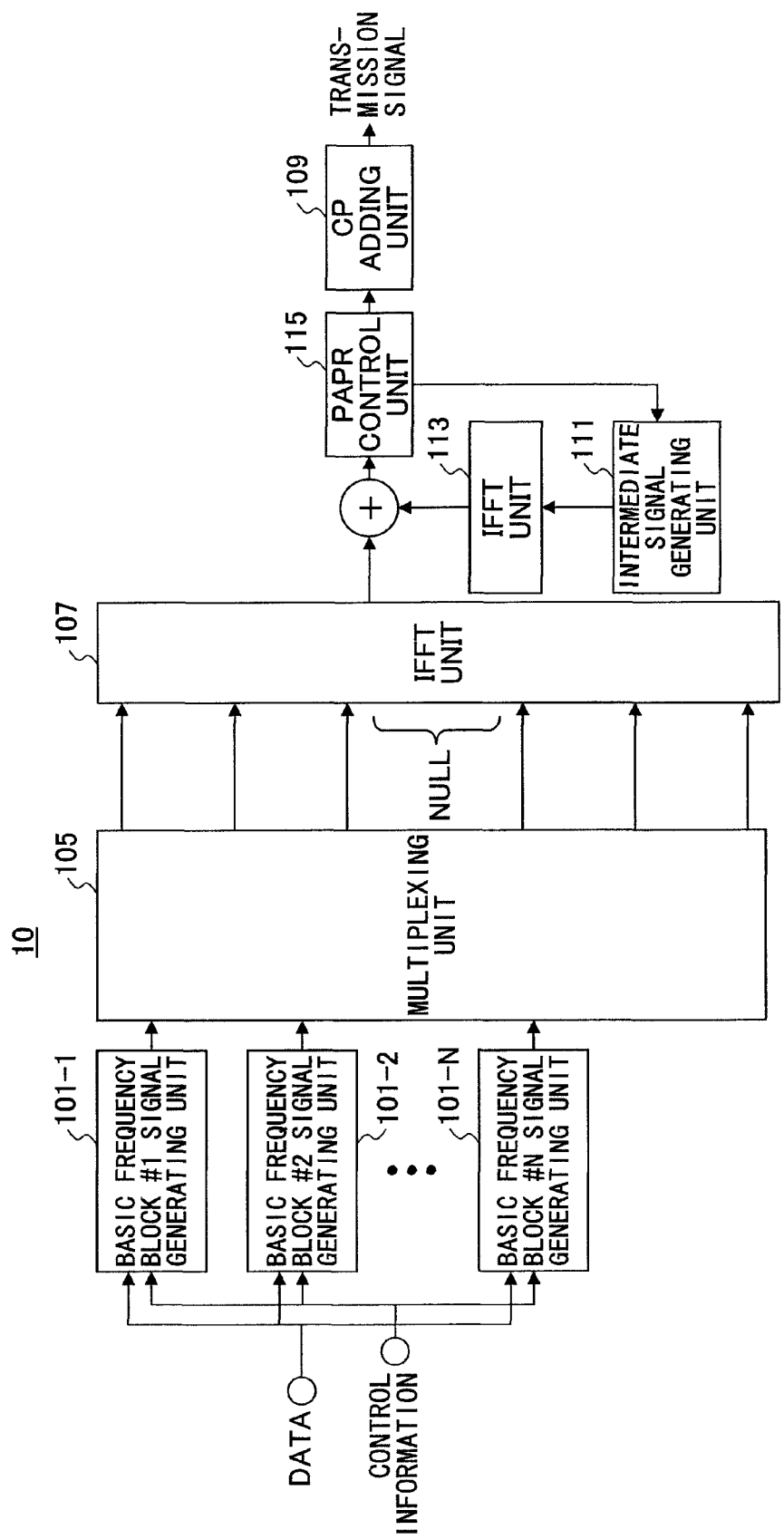
FIG. 5 shows a block diagram of a modification of the base station.

FIG. 5 shows a block diagram of a modification of the base station 10 shown in FIG. 4. While the base station 10 shown in FIG. 4 multiplexes the intermediate signals in the frequency domain, the base station 10 may multiplex the intermediate signals in the time domain in the case where the intermediate signals are signals for suppressing PAPR. FIG. 5 shows a base station 10 which multiplexes signals for suppressing PAPR in the time domain.

The base station 10 includes basic frequency block generating units 101-1 through 101-N, a multiplexing unit 105, an IFFT unit 107, an intermediate signal generating unit 111, an IFFT unit 113, a PAPR control unit 115, and a CP adding unit 109. The base station 10 includes the basic frequency block signal generating units 101-1 through 101-N corresponding to the number of basic frequency blocks included in the system band.

Each of the basic frequency block signal generating units 101-1 through 101-N generates data and control signals to be multiplexed into the signal band for the corresponding basic frequency block.

The multiplexing unit 105 controls the number of subcarriers such that the center frequencies of the signal bands for the respective basic frequency blocks are placed at predetermined frequency intervals. For example, when it is required that the center frequencies of the signal bands for the respective basic frequency blocks be placed at 100 kHz channel rasters, the multiplexing unit 105 adds one or more subcarriers between the signal bands for the basic frequency blocks to control the positions of the center frequencies.

The multiplexing unit 105 multiplexes the data and control signals generated by the basic frequency block signal generating units 101-1 through 101-N into signal bands for the respective basic frequency blocks. The multiplexing unit 105 may multiplex control signals such as reference signals. For example, the multiplexing unit 105 multiplexes the data and control signals into the signal bands of 18.015 MHz for the respective basic frequency blocks. In addition, the multiplexing unit 105 multiplexes predetermined signals such as null signals into the subcarriers added between the signal bands for the respective basic frequency blocks. For example, the multiplexing unit 105 multiplexes the null signals into the added nineteen subcarriers (285 kHz). The null signals represent signals which do not include effective signal components. The null signals may be signals formed by all zeros (a series of zeros).

The IFFT unit 107 performs inverse Fourier transformation of the multiplexed signals to convert the signals into the time domain. The IFFT unit 107 preferably performs inverse Fourier transformation for the whole system band, rather than for each basic frequency block.

The intermediate signal generating unit 111 generates intermediate signals using radio resources for the added subcarriers. According to this modification, the intermediate signals are signals for suppressing PAPR (peak to average power ratio) of transmission signals. For example, the intermediate signal generating unit 111 generates intermediate signals using radio resources for the added nineteen subcarriers (285 kHz).

The IFFT unit 113 performs inverse Fourier transformation of the intermediate signals generated by the intermediate signal generating unit 111 to convert the signals into the time domain.

The PAPR control unit 115 calculates PAPR of combined signals between the signals formed by the IFFT unit 107 and the signals formed by the IFFT unit 113, and determines whether the PAPR is below a predetermined threshold. When the PAPR is above the predetermined threshold, the PAPR control unit 115 instructs the intermediate signal generating unit 111 to generate other intermediate signals. When the PAPR is below the predetermined threshold, the PAPR control unit 115 supplies the combined signals to the CP adding unit 109.

The CP adding unit 109 adds cyclic prefixes to transmission signals.

<Configuration of a Mobile Station>

Figure 6:
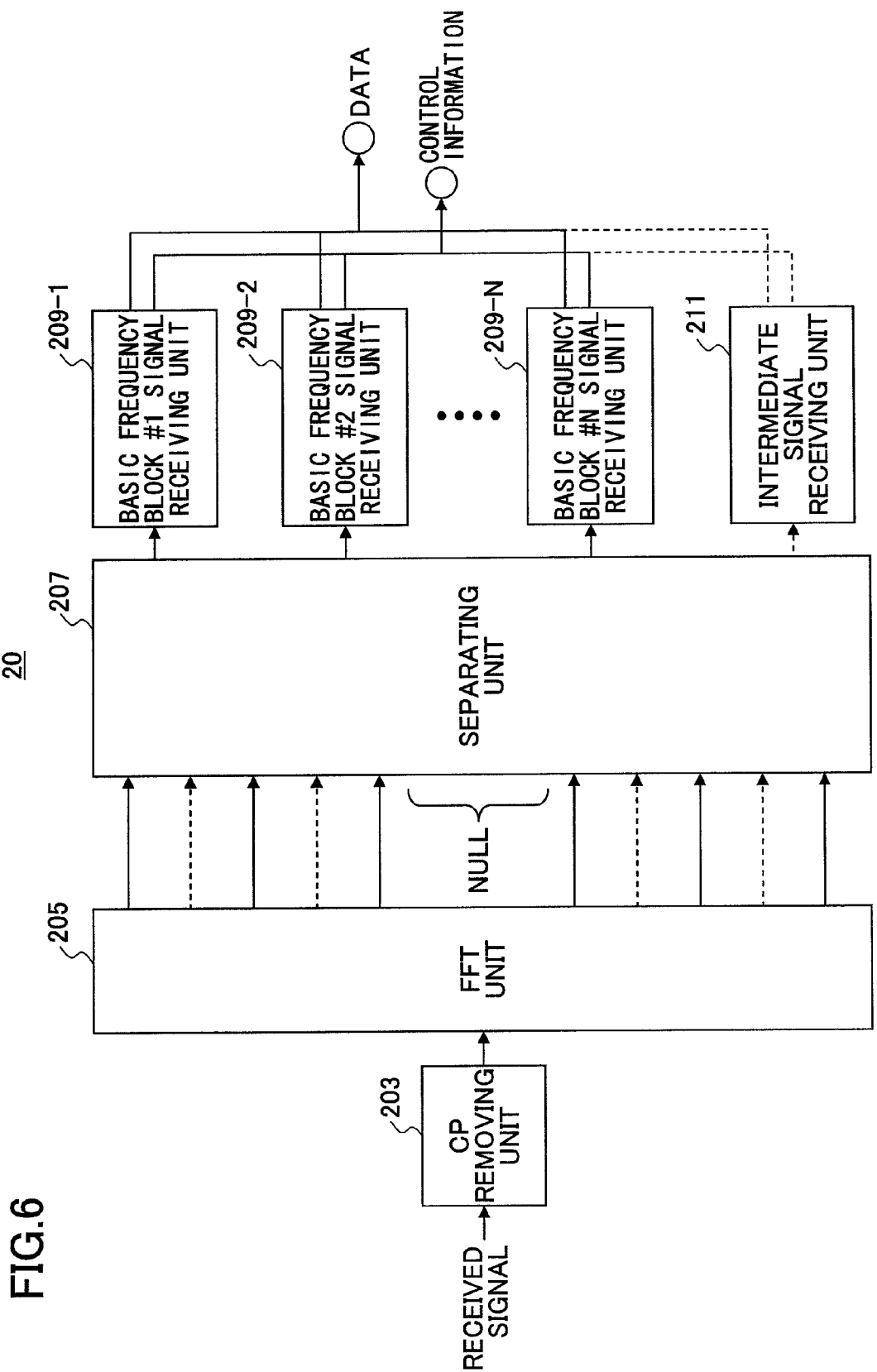
FIG. 6 shows a first exemplary block diagram of a mobile station.

FIG. 6 shows an exemplary block diagram of a mobile station 20 for implementing the second example of combining basic frequency blocks as shown in FIG. 3(B). The mobile station 20 includes a CP removing unit 203, an FFT (fast Fourier transform) unit 205, a separating unit 207, basic frequency block signal receiving units 209-1 through 209-N, and an intermediate signal receiving unit 211. The mobile station 20 includes the basic frequency block signal receiving units 209-1 through 209-N corresponding to the number of basic frequency blocks included in the transmission and reception band of the mobile station 20. It should be noted that the transmission and reception bandwidth of the mobile station 20 may be different from the system bandwidth of the base station 10. For example, the transmission and reception bandwidth of the mobile station 20 may be 40 MHz, while the system bandwidth of the base station 10 may be 100 MHz. In this example, the mobile station 20 includes two basic frequency block signal receiving units, while the base station 10 includes five basic frequency block signal generating units.

The CP removing unit 203 removes cyclic prefixes from received signals.

The FFT unit 205 performs Fourier transformation of the signals from which cyclic prefixes are removed to convert the signals into the frequency domain. The FFT unit 205 preferably performs Fourier transformation for the whole system band, rather than for each basic frequency block.

The separating unit 207 separates data and control signals from the signals converted into the frequency domain based on the configuration of subcarriers in the transmission and reception band including information about the added subcarriers. The separating unit 207 may also separate reference signals from the signals converted into the frequency domain. In addition, the separating unit 207 separates intermediate signals multiplexed into the added subcarriers. For example, when the intermediate signals are data signals or control signals for IMT-A terminals, the separating unit 207 supplies the intermediate signals to the intermediate signal receiving unit 211. For example, when the intermediate signals are signals for suppressing PAPR of transmission signals, the separating unit 207 may discard the intermediate signals. It should be noted that the configuration of subcarriers in the transmission and reception band may be determined in advance in the system or may be determined by the base station and provided to mobile stations on a broadcast channel.

Each of the basic frequency block signal receiving units 209-1 through 209-N demodulates and decodes the data and control signals in the corresponding basic frequency block.

The intermediate signal receiving unit 211 demodulates and decodes the intermediate signals multiplexed into the added subcarriers. For example, the intermediate signal receiving unit 211 demodulates and decodes the data signals or control signals for IMT-A terminals, which are multiplexed into the added subcarriers. When the intermediate signals are signals for suppressing PAPR, the mobile station 20 may not include the intermediate signal receiving unit 211, since the separating unit 207 may discard the intermediate signals.

<Flowchart of a Signal Transmission and Reception Method>

Figure 7:
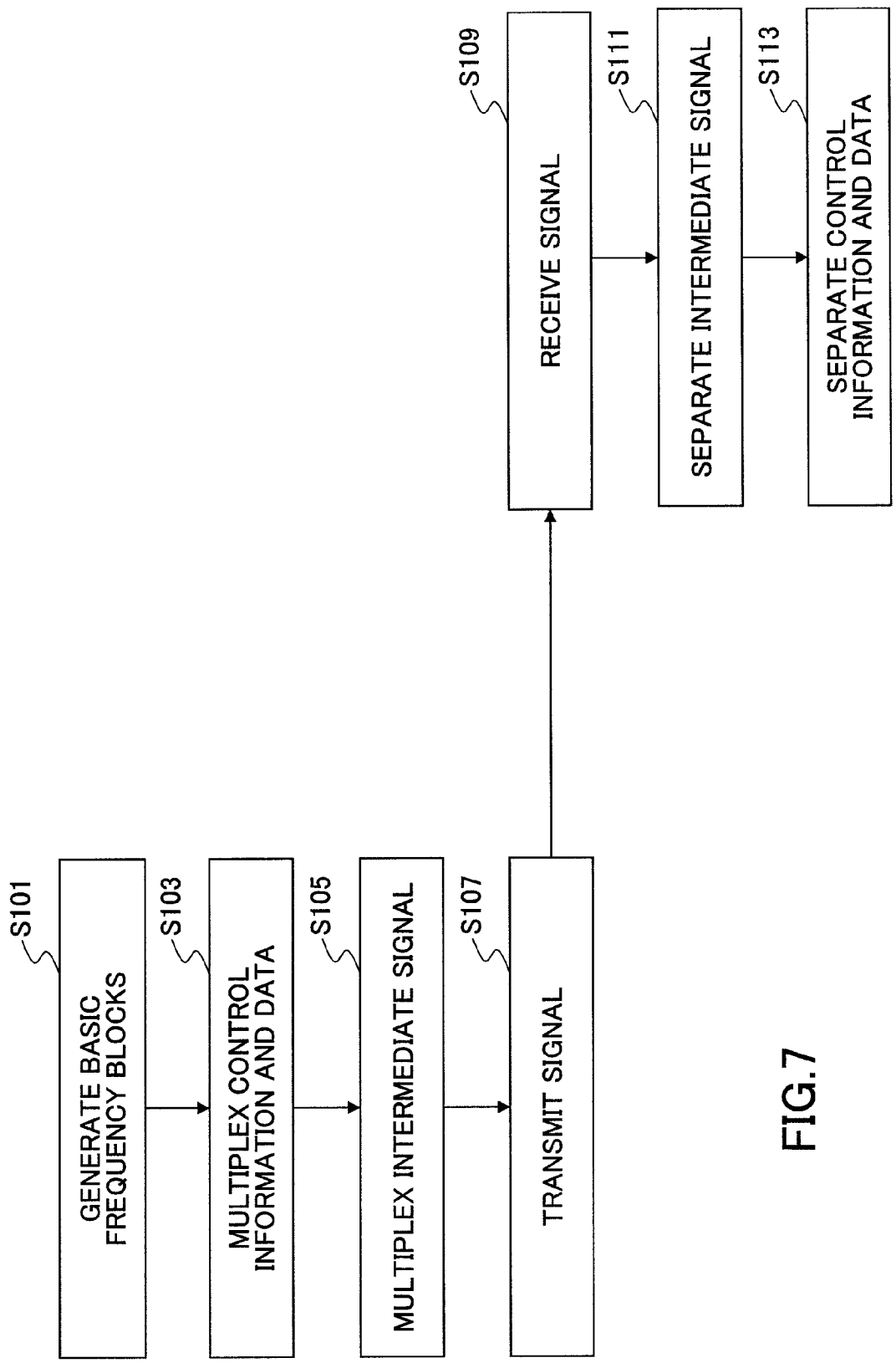
FIG. 7 shows a first exemplary flowchart of a signal transmission and reception method between a base station and a mobile station.

FIG. 7 shows a flowchart of a signal transmission and reception method between the base station 10 shown in FIG. 4 or FIG. 5 and the mobile station 20 shown in FIG. 6.

First, the system band is divided into plural basic frequency blocks, each having a predetermined band (S101). The multiplexing unit 105 in the base station 10 adds one or more subcarriers such that the center frequencies of the signal bands for the respective basic frequency blocks are placed at predetermined frequency intervals.

Each of the basic frequency block signal generating units 101-1 through 101-N in the base station 10 generates data and control signals to be multiplexed into the signal band for the corresponding basic frequency block. The multiplexing unit 105 multiplexes the data and control signals into the signal bands for the respective basic frequency blocks (S103).

The intermediate signal generating unit 103 in the base station 10 generates intermediate signals to be multiplexed into the added subcarriers. The multiplexing unit 105 multiplexes the intermediate signals generated by the intermediate signal generating unit 103 into the added subcarriers (S105).

The multiplexed signals are transmitted to the mobile station 20 (S107).

Then, the mobile station 20 receives signals transmitted from the base station 10 (S109).

The separating unit 207 in the mobile station 20 separates the intermediate signals from the received signals based on the configuration of subcarriers in the transmission and reception band (S111). The separating unit 207 may discard the intermediate signals. Alternatively, the intermediate signal receiving unit 211 may demodulate and decode the intermediate signals.

The separating unit 207 in the mobile station 20 separates the data and control signals from the received signals based on the configuration of subcarriers in the transmission and reception band (S113). Each of the basic frequency block signal receiving units 209-1 through 209-N decodes the corresponding data and control signals.

<Another Example of Combining Basic Frequency Blocks>

With reference to FIG. 8, another example of combining plural basic frequency blocks is described below. While, for ease of explanation, the system band is divided into three basic frequency blocks in FIG. 8, the system band may be divided into any number of basic frequency blocks. As shown in FIG. 1, the system band may be formed by plural basic frequency blocks and the remaining subcarriers.

FIG. 8(A) shows a third example of combining basic frequency blocks by removing a guard band between adjacent basic frequency blocks. In the same radio access system, interference among basic frequency blocks can be reduced by allocation of orthogonal radio resources. In other words, the guard band between adjacent basic frequency blocks can be removed.

In the example shown in FIG. 8(A), however, the center frequencies of the signal bands for the basic frequency blocks #1 and #3 may not be placed at predetermined frequency intervals. As shown in FIG. 8(B), for example, when each basic frequency block has a signal band of 18.015 MHz, the center frequencies of the signal bands for the basic frequency blocks #1 and #3 are not placed at 100 kHz channel rasters. This is because the signal bandwidth for each basic frequency block is not an integral multiple of 100 kHz.

Even so, the center frequency of the signal band for the basic frequency block #2 is placed at 100 kHz channel rasters. Accordingly, a mobile station can detect the basic frequency block #2 by performing cell search at 100 kHz intervals.

Figure 9:
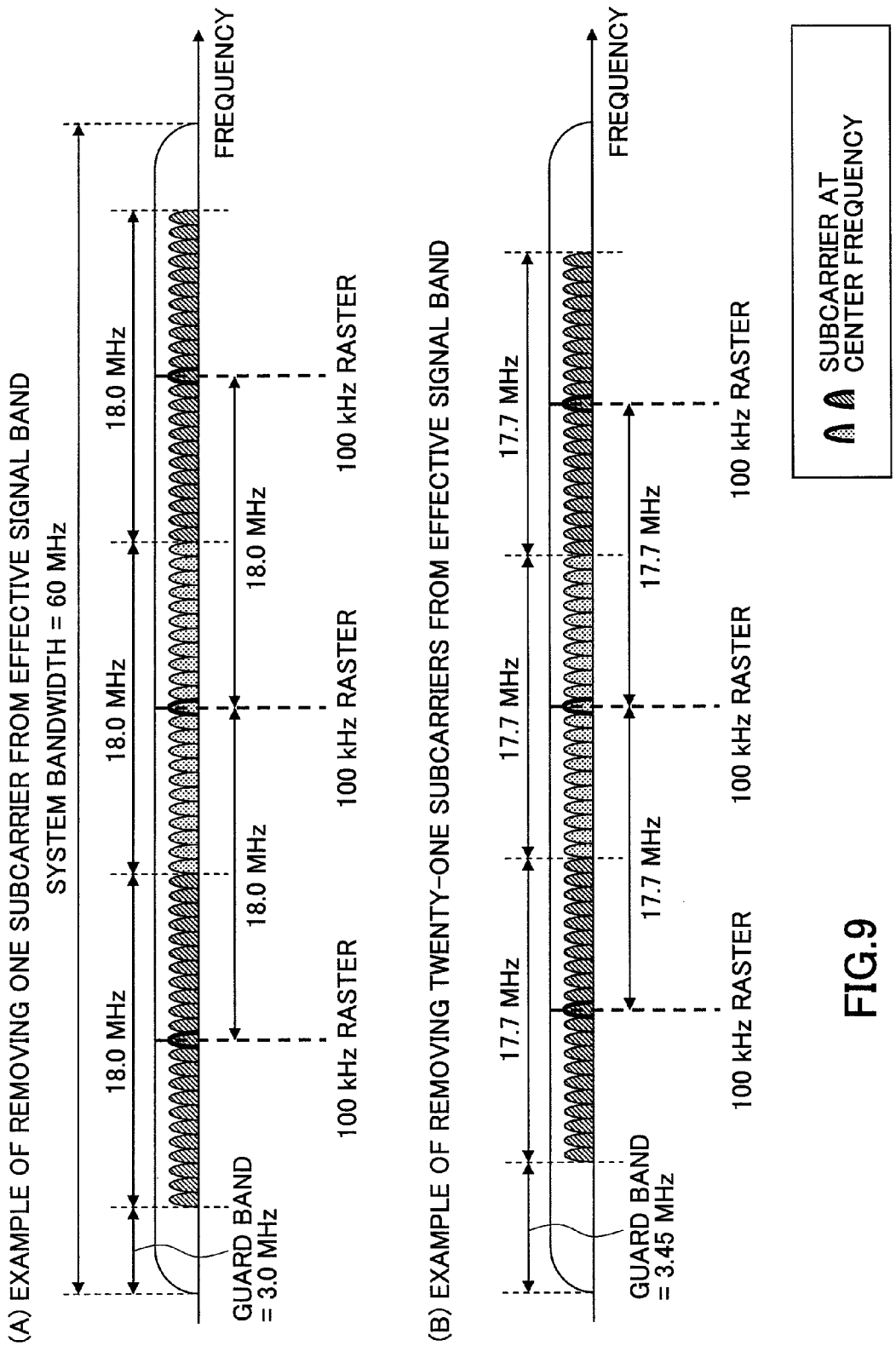
FIG. 9 shows a modification of the third example of combining basic frequency blocks.

FIG. 9 shows a modification of the third example of combining basic frequency blocks shown in FIG. 8. Specifically, one or more subcarriers are removed such that the center frequencies of the signal bands for the respective basic frequency blocks are placed at predetermined frequency intervals. As shown in FIG. 9(A), for example, the base station may remove one subcarrier from the signal band for each basic frequency block to generate the signal band of 18.0 MHz. Subcarriers in each signal band of 18.0 MHz are consecutively placed without any spacing. By consecutively placing subcarriers, the displacement Δ shown in FIG. 2(B) can be avoided. By removing one subcarrier from the signal band for each basic frequency block, the interval between the center frequencies of the signal bands for the respective basic frequency blocks is reduced to 18.0 MHz, and thus the center frequencies can be placed at 100 kHz channel rasters. Alternatively, as shown in FIG. 9(B), the base station may remove twenty-one subcarriers from the signal band for each basic frequency block to generate the signal band of 17.7 MHz. By removing twenty-one subcarriers from the signal band for each basic frequency block, the interval between the center frequencies of the signal bands for the respective basic frequency blocks is reduced to 17.7 MHz, and thus the center frequencies can be placed at 100 kHz channel rasters. Accordingly, a mobile station can detect the basic frequency blocks #1-#3 by performing cell search at 100 kHz intervals.

Removing the guard bands will increase unused bands at the both ends of the system band. These unused bands may be used for guard bands or used for transmission and reception of data or control signals.

<Modified Configuration of a Base Station>

Figure 10:
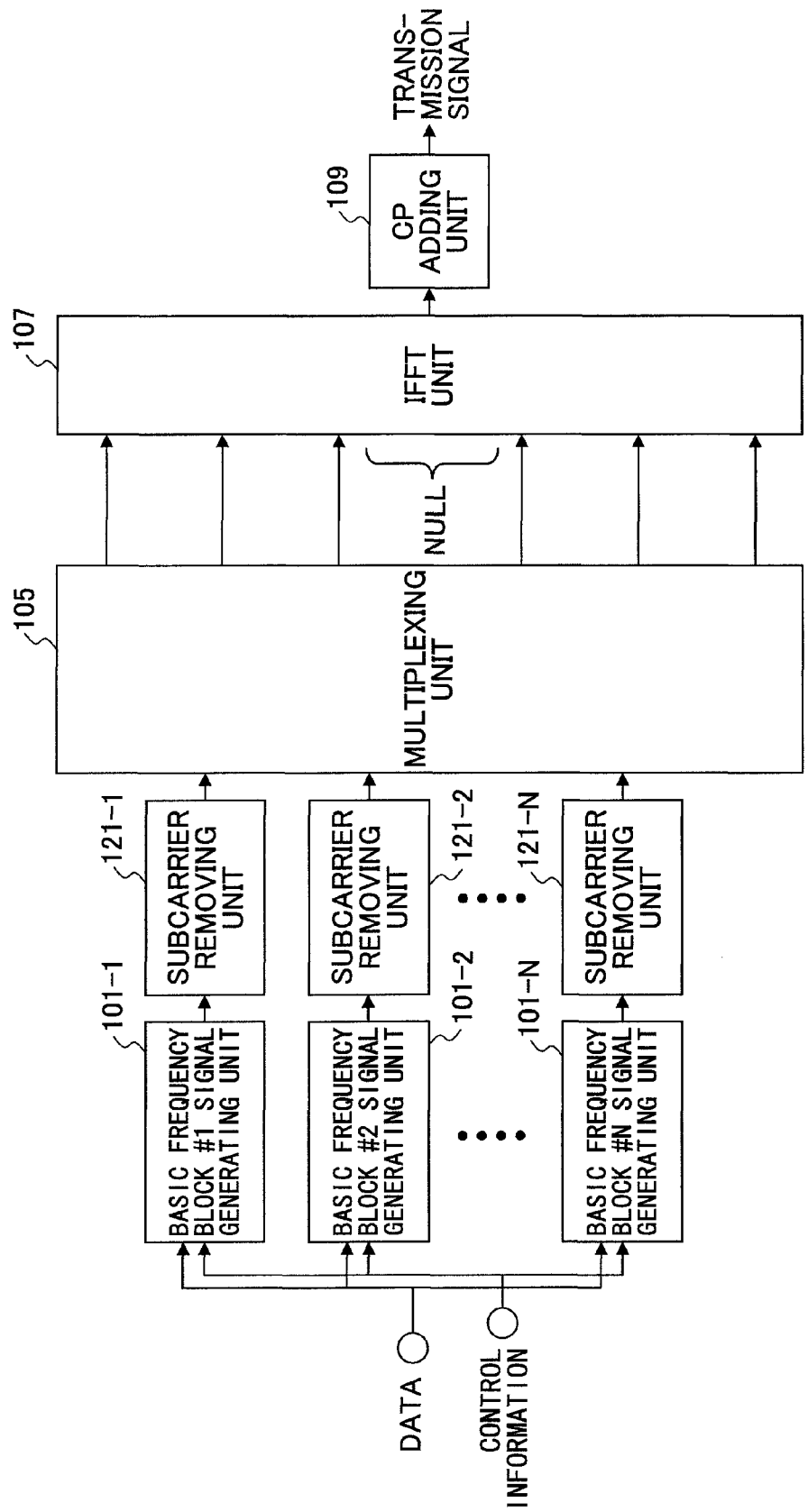
FIG. 10 shows a second exemplary block diagram of a base station.

FIG. 10 shows an exemplary block diagram of a base station 10 for implementing the examples of combining basic frequency blocks as shown in FIG. 9. The base station 10 includes basic frequency block signal generating units 101-1 through 101-N, subcarrier removing units 121-1 through 121-N, a multiplexing unit 105, an IFFT (inverse fast Fourier transform) unit 107, and a CP (cyclic prefix) adding unit 109. The base station 10 includes the basic frequency block signal generating units 101-1 through 101-N and the subcarrier removing units 121-1 through 121-N corresponding to the number of basic frequency blocks included in the system band.

Each of the basic frequency block signal generating units 101-1 through 101-N generates data and control signals.

Each of the subcarrier removing units 121-1 through 121-N controls the number of subcarriers such that the center frequencies of the signal bands for the respective basic frequency blocks are placed at predetermined frequency intervals. For example, when it is required that the center frequencies of the signal bands for the respective basic frequency blocks be placed at 100 kHz channel rasters, each of the subcarrier removing units 121-1 through 121-N removes (punctures) one or more subcarriers in the signal band for the basic frequency block to control the positions of the center frequencies. For example, when the basic frequency block has a signal band of 18.015 MHz, each of the subcarrier removing units 121-1 through 121-N may remove one subcarrier (15 kHz) or twenty-one subcarriers (315 kHz) from the signal band for the corresponding basic frequency block. By removing one subcarrier or twenty-one subcarriers, the interval between the center frequencies of the signal bands for the respective basic frequency blocks is reduced to 18.0 MHz or 17.7 MHz, and thus the center frequencies can be placed at 100 kHz channel rasters. It should be noted that the configuration of subcarriers in the system band including information about the removed subcarriers may be determined in advance in the system or may be determined by the base station and provided to mobile stations on a broadcast channel.

The multiplexing unit 105 multiplexes the data and control signals into the signal bands for the respective basic frequency blocks, in which the number of subcarriers is decreased. The multiplexing unit 105 may multiplex control signals such as reference signals. For example, the multiplexing unit 105 multiplexes the data and control signals into the signal bands of 18.0 MHz or 17.7 MHz for the respective basic frequency blocks.

The IFFT unit 107 performs inverse Fourier transformation of the multiplexed signals to convert the signals into the time domain. The IFFT unit 107 preferably performs inverse Fourier transformation for the whole system band, rather than for each basic frequency block. It should be noted that the IFFT unit 107 performs inverse Fourier transformation in consideration of guard bands (shown as NULL) at both ends of the system band.

The CP adding unit 109 adds cyclic prefixes to transmission signals.

While the base station 10 shown in FIG. 10 implements the examples of combining basic frequency blocks as shown in FIG. 9, the base station 10 may not include the subcarrier removing units 121-1 through 121-N in order to implement the example of combining basic frequency blocks as shown in FIG. 8(B).

<Modified Configuration of a Mobile Station>

Figure 11:
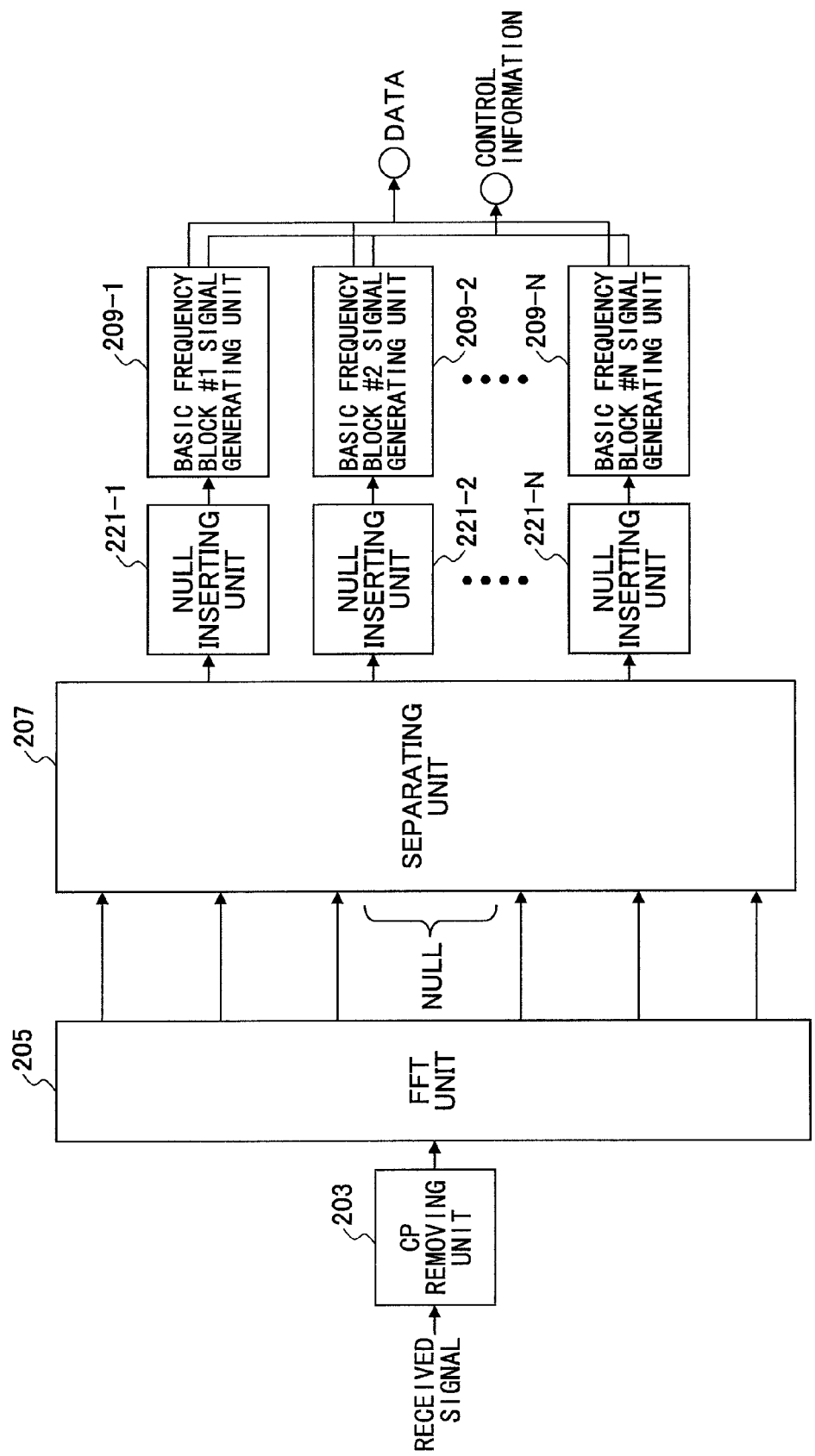
FIG. 11 shows a second exemplary block diagram of a mobile station.

FIG. 11 shows an exemplary block diagram of a mobile station 20 for implementing the examples of combining basic frequency blocks as shown in FIG. 9. The mobile station 20 includes a CP removing unit 203, an FFT (fast Fourier transform) unit 205, a separating unit 207, null inserting units 221-1 through 221-N, and basic frequency block signal receiving units 209-1 through 209-N. The mobile station 20 includes the basic frequency block signal receiving units 209-1 through 209-N corresponding to the number of basic frequency blocks included in the transmission and reception band of the mobile station 20. It should be noted that the transmission and reception bandwidth of the mobile station 20 may be different from the system bandwidth of the base station 10. For example, the transmission and reception bandwidth of the mobile station 20 may be 40 MHz, while the system bandwidth of the base station 10 may be 100 MHz. In this example, the mobile station 20 includes two basic frequency block signal receiving units, while the base station 10 includes five basic frequency block signal generating units.

The CP removing unit 203 removes cyclic prefixes from received signals.

The FFT unit 205 performs Fourier transformation of the signals from which cyclic prefixes are removed to convert the signals into the frequency domain. The FFT unit 205 preferably performs Fourier transformation for the whole system band, rather than for each basic frequency block.

The separating unit 207 separates data and control signals for each basic frequency block from the signals converted into the frequency domain. The separating unit 207 may also separate reference signals from the signals converted into the frequency domain. In this example, the number of subcarriers has been decreased in the signal band for each basic frequency block. It should be noted that the configuration of subcarriers in the transmission and reception band including information about the decrease in the number of subcarriers may be determined in advance in the system or may be determined by the base station and provided to mobile stations on a broadcast channel.

Each of the null inserting units 221-1 through 221-N inserts predetermined signals such as null signals into the frequency band corresponding to the removed subcarriers. The null signals represent signals which do not include effective signal components. The null signals may be signals formed by all zeros (a series of zeros).

Each of the basic frequency block signal receiving units 209-1 through 209-N demodulates and decodes the data and control signals in the corresponding basic frequency block. It should be noted that data and control signals are not multiplexed into the subcarriers into which the null signals are inserted by the null inserting units 221-1 through 221-N. Since the null signals are inserted, each of the basic frequency block signal receiving units 209-1 through 209-N can process the signals in the same manner as the case where the number of subcarriers is not decreased. For example, each of the basic frequency block signal receiving units 209-1 through 209-N can process the signals assuming that the basic frequency block has a signal band of 18.015 MHz.

While the mobile station 20 shown in FIG. 11 implements the examples of combining basic frequency blocks as shown in FIG. 9, the mobile station 20 may not include the null inserting units 221-1 through 221-N in order to implement the example of combining basic frequency blocks as shown in FIG. 8(B).

<Modified Flowchart of a Signal Transmission and Reception Method>

Figure 12:
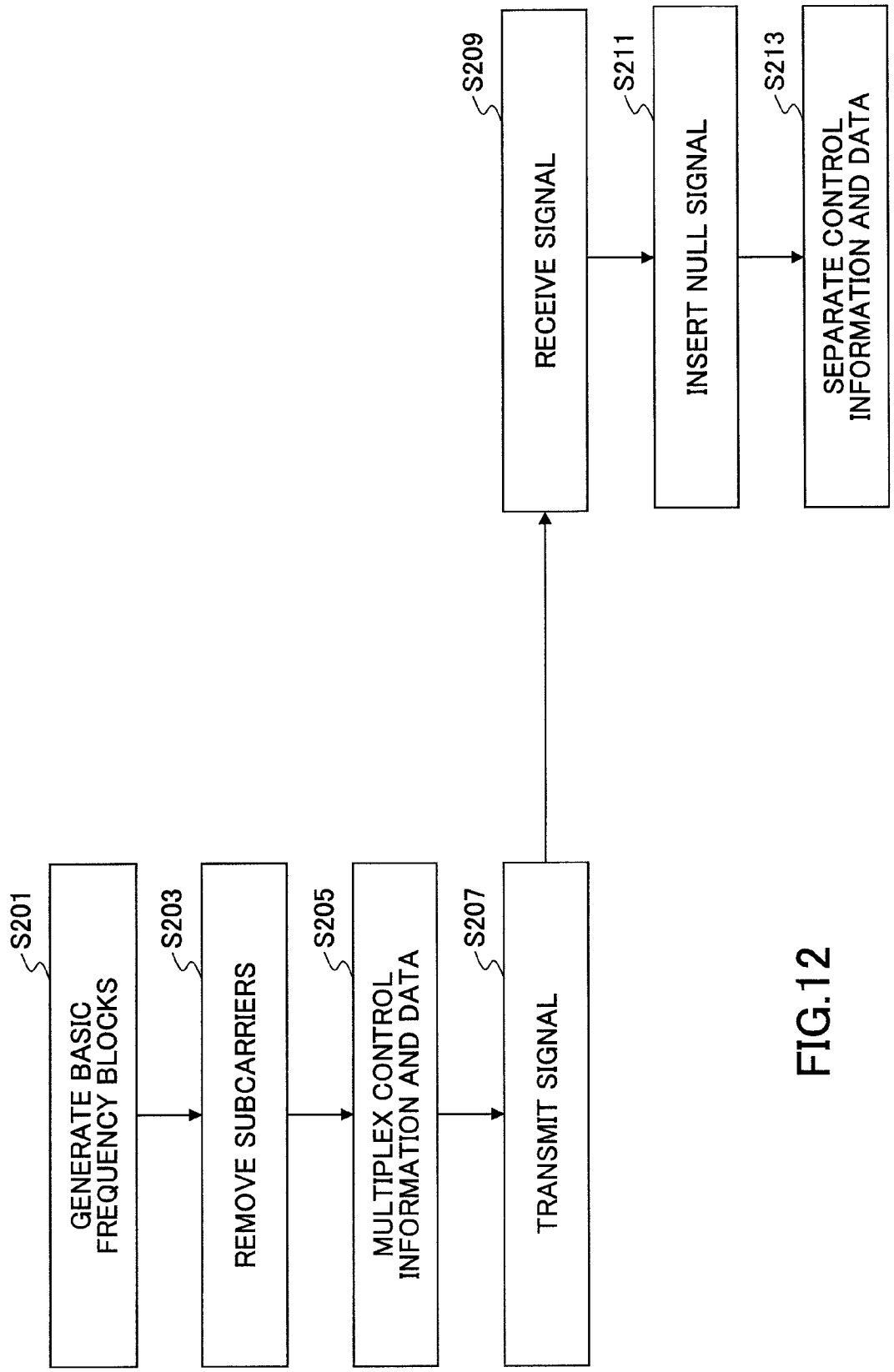
FIG. 12 shows a second exemplary flowchart of a signal transmission and reception method between a base station and a mobile station.

FIG. 12 shows a flowchart of a signal transmission and reception method between the base station 10 shown in FIG. 10 and the mobile station 20 shown in FIG. 11.

First, the system band is divided into plural basic frequency blocks, each having a predetermined band (S201). Each of the subcarrier removing units 121-1 through 121-N in the base station 10 decreases the number of subcarriers in the frequency band for the corresponding basic frequency block, such that the center frequencies of the signal bands for the respective basic frequency blocks are placed at predetermined frequency intervals (S203).

Each of the basic frequency block signal generating units 101-1 through 101-N in the base station 10 generates data and control signals to be multiplexed into the signal band for the corresponding basic frequency block. The multiplexing unit 105 multiplexes the data and control signals into the signal bands for the respective basic frequency blocks, in which the number of subcarriers is decreased (S205).

The multiplexed signals are transmitted to the mobile station 20 (S207).

Then, the mobile station 20 receives signals transmitted from the base station 10 (S209).

The separating unit 207 in the mobile station 20 separates the data and control signals for each basic frequency block from the received signals based on the configuration of subcarriers in the transmission and reception band. Each of the null inserting units 221-1 through 221-N inserts null signals into the frequency band (the frequency band in which the number of subcarriers is decreased) corresponding to the removed subcarriers (S211).

Each of the basic frequency block signal receiving units 209-1 through 209-N decodes the data and control signals from subcarriers other than the subcarriers into which the null signals are inserted (S213).

According to an embodiment of the present invention, the multiplexing unit 105 in the base station 10 adds one or more subcarriers such that the center frequencies of the signal bands for the respective basic frequency blocks are placed at predetermined frequency intervals. Alternatively, each of the subcarrier removing units 121-1 through 121-N removes one or more subcarriers such that the center frequencies of the signal bands for the respective basic frequency blocks are placed at predetermined frequency intervals. Accordingly, the mobile station 20 can detect each basic frequency block by performing cell search at the predetermined frequency intervals.

In addition, when the system band corresponds to the system band for IMT-A and the basic frequency block corresponds to the system band for E-UTRA, the base station 10 can support both IMT-A terminals and E-UTRA terminals. When all the center frequencies of the signal bands for the respective basic frequency blocks are placed at the predetermined frequency intervals as shown in FIGS. 3(B) and 9, the base station 10 can support E-UTRA terminals in all the basic frequency blocks.

On the other hand, when the center frequency of the signal band for the center basic frequency block is placed at the predetermined frequency intervals as shown in FIG. 8(B), the base station 10 can support E-UTRA terminals in the center basic frequency block. In order to implement the example shown in FIG. 8(B), the base station 10 may not include the subcarrier removing units 121-1 through 121-N, and accordingly, the base station 10 can be simplified. In addition, in order to implement the example shown in FIG. 8(B), the mobile station 20 may not include the null inserting units 221-1 through 221-N, and accordingly, the mobile station 20 can be simplified.

According to the embodiment of the present invention, the base station 10 includes the single IFFT unit 107 and the mobile station 20 includes the single FFT unit 205. The IFFT unit 107 can perform inverse Fourier transformation for the whole system band and the FFT unit 205 can perform Fourier transformation for the whole system band. Even if the system band includes plural basic frequency blocks, the base station 10 and the mobile station 20 can process signals in the plural basic frequency blocks with a single Fourier transformation process.

The base station 10 shown in FIG. 10 includes the subcarrier removing units 121-1 through 121-N and the mobile station 20 shown in FIG. 11 includes the null inserting units 221-1 through 221-N. The null inserting units 221-1 through 221-N may insert null signals into the removed (punctured) subcarriers. By inserting the null signals, components in the mobile station 20 such as the basic frequency block signal receiving units 209-1 through 209-N can process signals assuming that the basic frequency block has a signal band of 18.015 MHz as defined in E-UTRA. Accordingly, compatibility with the existing system such as E-UTRA can be retained.

In the third example of combining basic frequency blocks as shown in FIG. 8(B), the ratio of the guard band to the system band can remain the same as the ratio in the case of E-UTRA. Thus, the base station 10 and the mobile station 20 can overcome interference with other systems as is the case with the E-UTRA system.

In the modification of the third example of combining basic frequency blocks as shown in FIG. 9, the ratio of the guard band to the system band can be greater than the ratio in the case of E-UTRA. Thus, the base station 10 and the mobile station 20 can reduce interference with other systems more than the E-UTRA systems.

In the second example of combining basic frequency blocks as shown in FIG. 3(B), intermediate signals may be data signals or control signals for IMT-A terminals. Accordingly, the base station 10 and the mobile station 20 can improve transmission efficiency (frequency usage efficiency).

The intermediate signal generating unit 103 or 111 in the base station 10 can generate, as intermediate signals, signals for suppressing peak power of transmission signals. While OFDM (orthogonal frequency multiple access) signals typically have high PAPR, the base station 10 can reduce PAPR of transmission signals.

In the embodiments of the present invention, migration from the existing radio access system such as the E-UTRA system to the new radio access system such as the IMT-Advanced system is taken as an example. However, the present invention is not limited to these embodiments, but can be applied to any radio access system in which full support of the existing terminals and a wider bandwidth are required.

This international patent application is based on Japanese Priority Application No. 2008-207487 filed on Aug. 11, 2008, the entire contents of which are incorporated herein by reference.

DESCRIPTION OF NOTATIONS 10 base station
101-1, . . . , 101-N basic frequency block signal generating unit
103 intermediate signal generating unit
105 multiplexing unit
107 IFFT unit
109 CP adding unit
111 intermediate signal generating unit
113 IFFT unit
115 PAPR control unit
121-1, . . . , 121-N subcarrier removing unit
20 mobile station
203 CP removing unit
205 FFT unit 207 separating unit
209-1, ..., 209-N basic frequency block signal receiving unit
211 intermediate signal receiving unit
221-1, ..., 221-N null inserting unit

The invention claimed is:

1. A base station for communicating within a system band including plural basic frequency blocks, comprising:
 a signal generating unit configured to generate data and control signals;
 an intermediate signal generating unit configured to generate intermediate signals;
 a multiplexing unit configured to add one or more subcarriers such that center frequencies of signal bands for the respective basic frequency blocks are placed at predetermined frequency intervals, and multiplex the intermediate signals and data and control signals; and
 a transmitting unit configured to transmit the multiplexed signals.

2. The base station as claimed in claim 1, wherein:
 the multiplexing unit multiplexes the intermediate signals into the added subcarriers and the data and control signals into subcarriers in the signal bands for the basic frequency blocks.

3. The base station as claimed in claim 1, wherein:
 the intermediate signal generating unit generates the intermediate signals for suppressing peak power of transmission signals, and
 the multiplexing unit time-multiplexes the intermediate signals and the data and control signals.

4. A signal transmission method, comprising the steps of:
 dividing a system band into plural basic frequency blocks;
 generating data and control signals;
 generating intermediate signals;
 adding one or more subcarriers such that center frequencies of signal bands for the respective basic frequency blocks are placed at predetermined frequency intervals;
 multiplexing the intermediate signals and data and control signals; and
 transmitting the multiplexed signals.

5. A base station for communicating within a system band including plural basic frequency blocks, comprising:
 a signal generating unit configured to generate data and control signals;
 a subcarrier decreasing unit configured to decrease the number of subcarriers in signal bands for the basic frequency blocks such that center frequencies of the signal bands for the respective basic frequency blocks are placed at predetermined frequency intervals;
 a multiplexing unit configured to multiplex the data and control signals into the respective basic frequency blocks in which the number of subcarriers is decreased; and
 a transmitting unit configured to transmit the multiplexed signals.

6. A signal transmission method, comprising the steps of:
 dividing a system band into plural basic frequency blocks;
 generating data and control signals;
 decreasing the number of subcarriers in signal bands for the basic frequency blocks such that center frequencies of the signal bands for the respective basic frequency blocks are placed at predetermined frequency intervals;
 multiplexing the data and control signals into the respective basic frequency blocks in which the number of subcarriers is decreased; and
 transmitting the multiplexed signals.

* * * * *